Nov. 4, 1958 J. C. GRIGGER 2,859,166
SHIELDING MEANS FOR EFFECTING UNIFORM PLATING
OF LEAD DIOXIDE IN THE FORMATION OF
LEAD DIOXIDE ELECTRODES
Filed Sept. 15, 1955
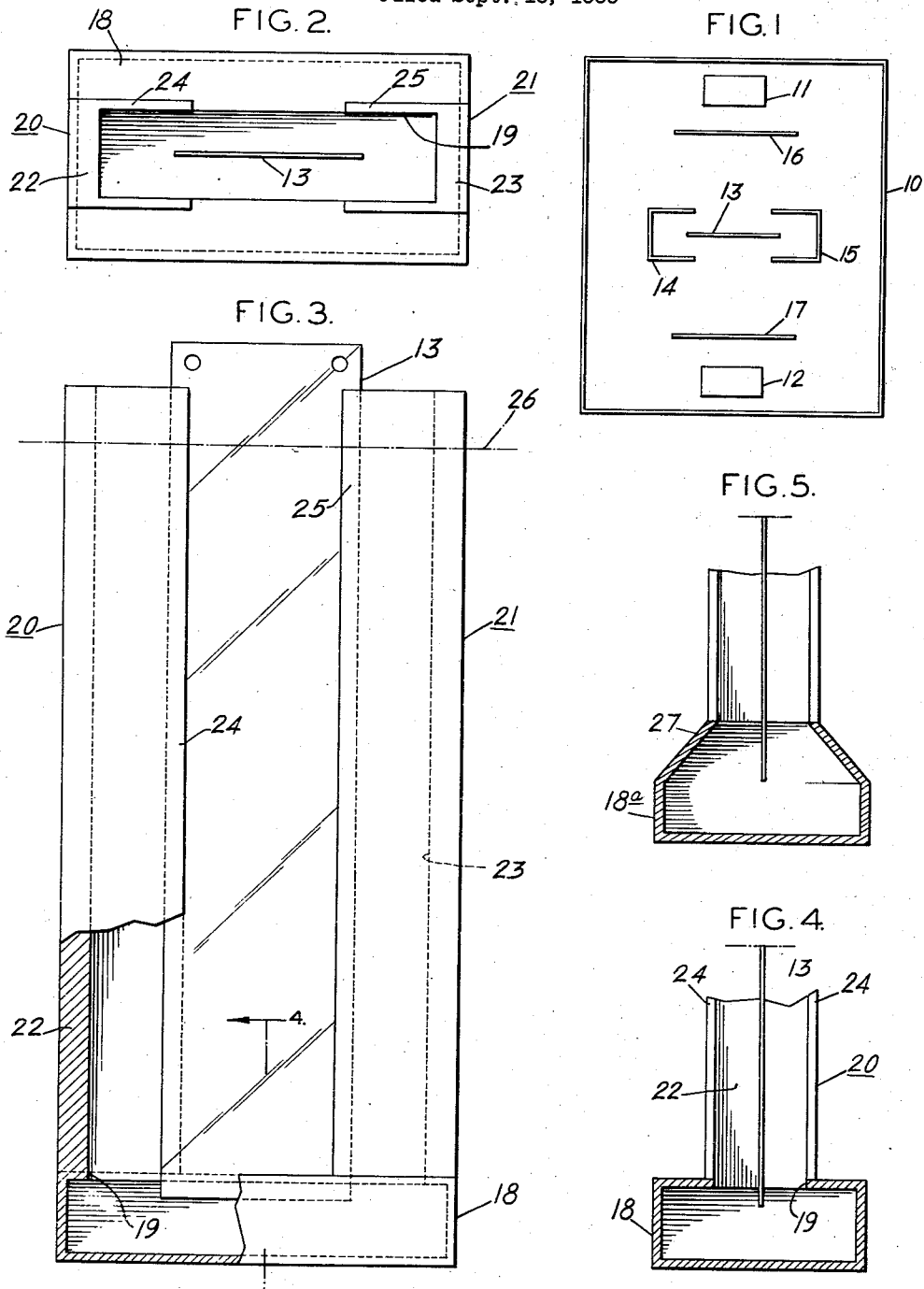
INVENTOR:
JOHN C. GRIGGER
BY Howson & Howson
ATTYS.

United States Patent Office 2,859,166
Patented Nov. 4, 1958

2,859,166

SHIELDING MEANS FOR EFFECTING UNIFORM PLATING OF LEAD DIOXIDE IN THE FORMATION OF LEAD DIOXIDE ELECTRODES

John C. Grigger, Springfield Township, Montgomery County, Pa., assignor to Pennsalt Chemicals Corporation, a corporation of Pennsylvania Application September 15, 1955, Serial No. 534,618

5 Claims. (Cl. 204—279)

This invention relates to the formation of massive lead dioxide electrodes, and more particularly to novel shielding means for use during the formation of such electrodes.

Lead dioxide electrodes are well suited to electrolytic processes where an inert non-corroding electrode is required. An example of such processes is the electrolytic oxidation of sodium chlorate to perchlorate, in which process an inert non-corroding anode is required. Lead dioxide electrodes, which are very well adapted for such purposes, may be formed by electroplating lead dioxide on a suitable conductive base material. Various base materials which may be employed include metals such as tantalum, nickel and steel, and materials such as graphite, magnetite and sintered silicon carbide mixtures. Because of the brittleness of lead dioxide in thin sections, it is preferably electroplated on the base material to a thickness of one-half inch to one inch or more.

Lead dioxide electrodes may be of various shapes depending upon the requirements, and the desired shape may be obtained by employing a base element shaped accordingly. Where the electrode is to be in the form of a rod, and the base element is a round rod with a rounded end, the massive deposit of lead dioxide can readily be made to form smoothly and evenly from a suitable plating bath. However, many electrolytic cells are designed to use flat rectangular electrodes in carrying out various electro-chemical reactions. To form massive lead dioxide electrodes of this shape, a base element in the form of a thin rectangular sheet or screen is used. As examples, tantalum sheet as thin as 0.003 inch, and 14 mesh tantalum screen made with 0.025 inch wire, have been used in flat rectangular shapes as base elements for massive lead dioxide electro-deposition.

In the formation of such electrodes in the usual lead dioxide plating bath, serious treeing and nodule formation of the lead dioxide tend to occur along and near the edges of the flat electrode due to current concentration in those areas. This effect becomes very pronounced as the thickness of the lead dioxide increases above about one-sixteenth inch. It can be minimized or effectively prevented by the employment of shielding means in association with the edge portions of the electrode to effect better current distribution. Thus a generally U-shaped shielding structure having channeled sides and bottom may be employed in association with the side and bottom edges of the electrode which are immersed in the plating bath. However, such a shielding structure is not entirely satisfactory because it tends to cause thinning out of the bottom edge portion of the massive lead dioxide electrode in the form of a sharp V, giving a sharp bottom edge. This is undesirable because during later use of the electrode in electrolytic processes, the current tends to concentrate at the sharp edge and this may result in accelerated corrosion in that area. For this reason, blunt or rounded edges are desired, as are produced along the side edges of the shielded electrode.

The principal object of this invention is to overcome this objection by the provision of novel and improved shielding means.

I have discovered that this objection can be overcome by providing an enlargement at the bottom of the shielding structure, as hereinafter more fully described. While I do not wish to be bound by any theory, I believe that the above-mentioned V-edge formation at the bottom of the massive lead dioxide electrode is due to very rapid depletion of lead from the plating solution in the area of the bottom edge portion, and that the bottom enlargement according to this invention prevents too-rapid depletion of lead and thus effects more uniform plating of the bottom edge portion.

The invention may be fully understood by reference to the accompanying drawing, wherein:

Fig. 1 is a small-scale diagrammatic plan view of a lead dioxide plating arrangement employing shielding means;

Fig. 2 is a plan view of a shielding structure according to the present invention;

Fig. 3 is a front or face view of such shielding structure with a portion broken away for the purpose of illustration;

Fig. 4 is a fragmentary sectional view taken on line 4—4 of Fig. 3; and

Fig. 5 is a view similar to Fig. 4 showing a modification.

Referring first to Fig. 1, there is shown a receptacle or tank 10 which contains a plating bath and within which are cathodes 11 and 12, which may be formed of graphite. Centrally located within the plating bath is the base element 13 on which the lead dioxide is deposited during the electroplating operation, for forming a massive lead dioxide anode. As mentioned above, treeing and nodule formation of the lead dioxide along and near the edges of the electrode may be prevented by employing a U-shaped shielding structure having channeled sides and bottom. In Fig. 1, the sides of such shielding structure are shown at 14 and 15. The shield structure may be fabricated of any suitable non-conducting material which is inert to chemical action of the plating bath. Shields fabricated of acrylic (e. g. methyl methacrylate) plastic sheet are suitable for use in an acid lead nitrate plating bath. Preferably, in addition to the shielding means associated with element 13, shielding sheets 16 and 17 are provided between element 13 and the cathodes, these sheets being formed of the same material as the primary shielding means.

By way of example, the following data is given with respect to a particular plating operation.

Lead dioxide was plated on a tantalum screen of 14 mesh having 0.025 inch wire
Screen dimensions=3 x 18 inches
Length of screen plated—14⅛ inches
Dimensions of plated anode=3½ x 14½ inches
Thickness of plated lead dioxide electrode—⅝ inch
Weight of lead dioxide plated—4500 grams
Plating bath=350 g./l. lead nitrate containing copper nitrate and surface-active addition agents:
    pH—1 to 2.2
    Temp.—70° C.
    Anode current density—15 amp./ft.$^2$
Cathodes—graphite As previously mentioned, a simple U-shaped shielding structure having channeled sides and bottom is not entirely satisfactory because it tends to cause a V formation of the bottom edge portion of the massive lead dioxide electrode. Figs. 2 to 4 show one form of an improved shielding structure according to the present invention which overcomes the above-mentioned objection.

This improved structure comprises a box-like bottom 18 of rectangular form, having a top opening 19 to receive the bottom edge portion of the base element 13 on which lead dioxide is deposited, and the structure further comprises channeled sides 20 and 21 extending upward from the box-like bottom. As may be seen in Fig. 3, the entire structure is generally U-shaped. For structural strength in the illustrated embodiment, the channeled sides 20 and 21 have relatively thick transverse wall sections 22 and 23, and thinner side wall sections 24 and 25. As shown in Fig. 4, the box-like bottom 18 is substantially greater in width than the width of the channels formed by the walls of the side members.

During use of the shielding structure in association with the element 13, the structure and said element are immersed in the plating bath to a level such as indicated at 26. The channeled side members 20 and 21 must be of a channel width to give the desired deposit along the side edge portions of element 13. By making the box-like bottom substantially wider than the channel width of the side members, the undesirable V-edge formation at the bottom of the massive lead dioxide electrode is effectively prevented, and the bottom edge of the electrode is caused to assume a blunt or rounded form similar to the formation along the side edge portions. As previously stated, it is believed that the enlarged bottom of the shielding structure accomplishes this result by preventing very rapid depletion of lead from the plating solution in the area of the bottom edge portion of the electrode.

In one physical embodiment of the structure, the channel width of the side members is approximately one and one-half inches, while the width of the box-like bottom is approximately three and three-fourths inches. Thus, in that embodiment, the box-like bottom is more than twice as wide as the channeled side members.

Fig. 5 shows a modification wherein the box-like bottom 18a has sloping side portions 27 instead of having straight vertical sides throughout its height as in the embodiment of Figs. 2 to 4. Also, in Fig. 5, the bottom section is slightly higher than in the first embodiment. The sloping sides serve to permit increased convection of electrolyte into and out of the box structure.

While certain structural forms of the invention have been illustrated and described, the invention is not limited thereto but contemplates such other forms as may be useful in practice to accomplish the desired purpose.

I claim:

1. Shielding means for effecting uniform plating of lead dioxide in the formation of a lead dioxide electrode, comprising a rectangular box-like base having a top opening, and inwardly-facing vertical opposed channel members extending upwardly from the top of said box-like base adjacent and aligned with said top opening and partially surrounding said opening, the base being substantially wider than the channel width of said members said shielding means being of insulating material.

2. Shielding means according to claim 1, wherein the sides of said base are substantially vertical throughout their height.

3. Shielding means according to claim 1, wherein said base has sloping side portions.

4. A generally U-shaped structure for shielding the side and bottom edge portions of a flat base element on which lead dioxide is plated, said structure comprising inwardly-facing opposed vertical channel members of predetermined width to effect optimum shielding of the side edge portions of said element, and a base below said members in the form of a receptacle of substantially greater width than said channel members and having a top opening of restricted size therein to prevent a sharp formation of deposited lead dioxide along the bottom edge portion of said element, said channels and said base being of insulating material and said members partially surrounding and being contiguous with said opening.

5. Shielding means for effecting uniform plating of lead dioxide in the formation of a lead dioxide electrode, comprising a rectangular box-like base having a rectangular shaped opening in the top thereof of a smaller size than said base, spaced inwardly facing and opposed vertical channel members extending upwardly from the top of said base and having their lower ends secured at the edges of opposed ends of said opening, said base being substantially wider than the channel width of said members, said base and said members being of insulating material.

References Cited in the file of this patent

UNITED STATES PATENTS

| | | |
|---|---|---|
| 1,276,649 | Hartzell | Aug. 20, 1918 |
| 1,354,234 | Blaetz | Sept. 28, 1920 |
| 1,587,303 | Hart | June 1, 1926 |
| 2,044,431 | Harrison | June 16, 1936 |
| 2,500,206 | Schaefer et al. | Mar. 14, 1950 |
| 2,549,927 | Ransburg | Apr. 24, 1951 |
| 2,711,155 | Starkey | June 21, 1955 |

FOREIGN PATENTS

| | | |
|---|---|---|
| 658,485 | Great Britain | Oct. 10, 1951 |